UNITED STATES PATENT OFFICE.

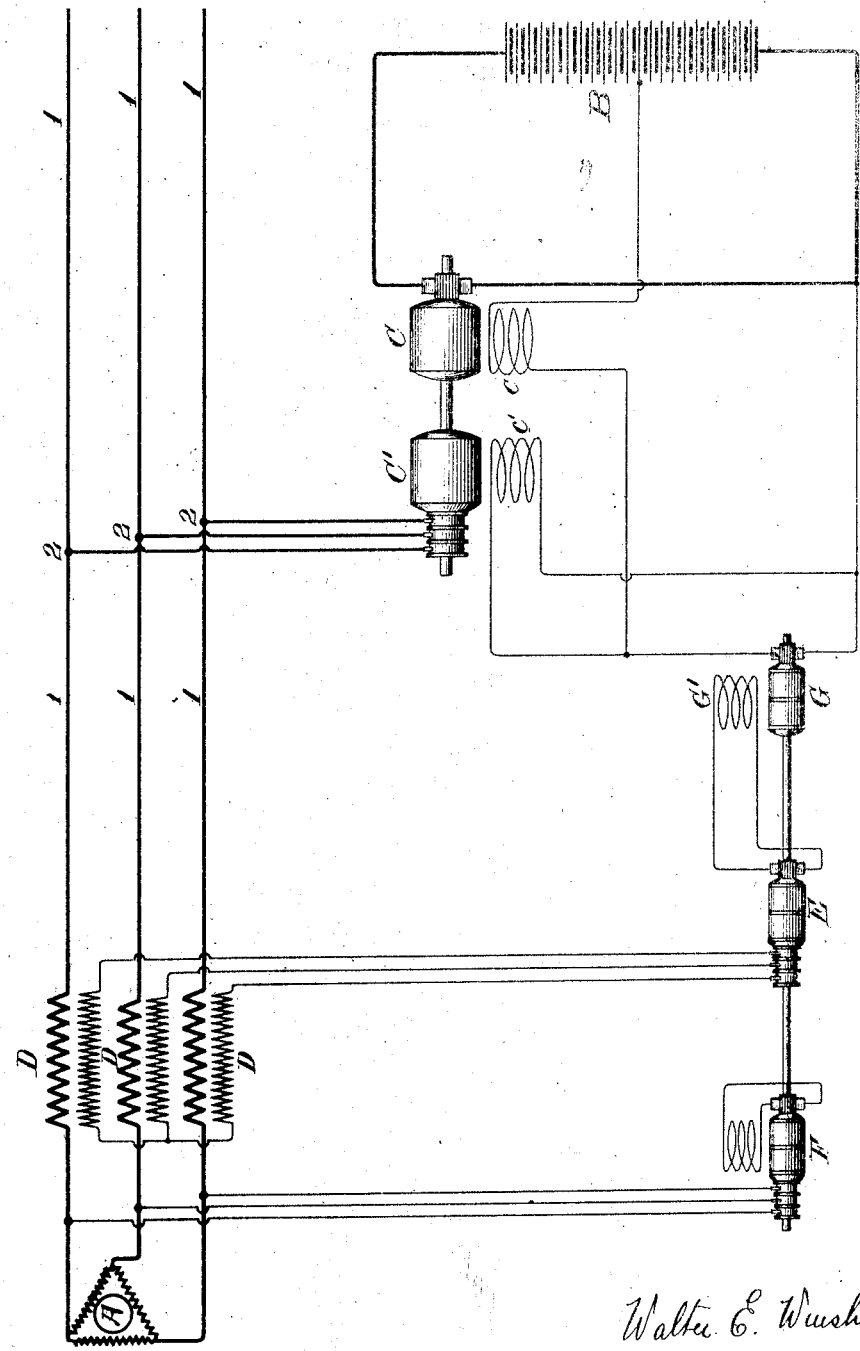

WALTER E. WINSHIP, OF NEW YORK, N. Y., ASSIGNOR TO GOULD STORAGE BATTERY COMPANY, A CORPORATION OF NEW YORK.

ELECTRICAL SYSTEM OF DISTRIBUTION.

No. 887,052.  Specification of Letters Patent.  Patented May 5, 1908.

Application filed September 25, 1906. Serial No. 336,134.

*To all whom it may concern:*

Be it known that I, WALTER E. WINSHIP, a citizen of the United States, and a resident of New York city, county and State of New York, have invented certain new and useful Improvements in Electrical Systems of Distribution, of which the following is a specification.

My invention relates to electrical systems of distribution in which there is a motor generator connecting two sides of the system, and is especially directed to the regulation of the motor generator so that it may efficiently transfer energy from one side of the system to the other as the needs of the system require.

My improvements have been specially devised with relation to a system of the general class in which a regulating storage battery, acting through the motor generator, serves to steady the load or voltage of an alternating current generator or source of supply, and my invention involves the automatic regulation of the motor generator responsively to the changes of electrical condition of the alternating current generator. This automatic regulation is effected by simultaneously and oppositely varying the electro-motive-forces generated at the opposite ends of the motor generator responsively to current changes of the alternating current generator in order to compel the generator to charge the battery when the load on the alternating current generator tends to fall and to compel the battery to discharge to assist the alternating current generator when the load on the latter tends to become great. My invention, however, in its broader phases is not limited to this specific combination.

The specific system which is diagrammatically shown in the accompanying drawing and by which I have illustrated my invention, comprises specific apparatus for effecting the opposite regulation of the two ends of the motor generator by oppositely regulating the field magnets of same, this apparatus including an exciter which supplies current for the field magnet of the alternating current end of the motor generator and which serves as a counter machine to oppose the current in the field windings of the direct current end of the motor generator. One feature of my invention involves such a means of exciting and regulating a motor generator.

My invention also includes various other features of combination and arrangement as hereinafter fully set out.

A main alternating current generator is indicated at A. In the present instance this generator is supplying energy for a work circuit 1.

B is a storage battery which is provided as a compensating influence being connected to the direct current end C of a motor generator, the alternating current end C' of which is connected at the points 2 to the conductors leading to generator A and to the work circuit. When the battery is to be charged the end C of the motor generator must become the motor and the end C' of the generator supplies current at a sufficiently high electromotive-force to force current through the battery. When the battery is to discharge the end C of the motor generator becomes the motor and the end C' must become the generator supplying current to the work circuit to assist the main generator.

When one end of the motor generator is to be a motor, the electro-motive-force generated by that end must necessarily be less than that impressed upon it, whereas when it is to become a generator its voltage must rise to become more or equal the controlling electro-motive-force. This result is accomplished efficiently by the apparatus now to be described.

D are transformers whose primaries are in the circuit of the alternating current generator, *i. e.*, they are between the generator and the points 2 and also between the generator and all parts of the working circuit. They are therefore subject to such portions of the variations of load as fall upon the main generator. This I consider the preferable position although it will be understood that my invention is not in all its features limited to such a location, it being only important that the coil or coils for controlling the regulating apparatus should be so placed as to be subject to fluctuations which may be used for regulation.

The secondaries of the transformers D are connected to a rectifier E. This rectifier may be of any type, being indicated in the present instance as a revolving core with windings but without a field magnet, one end of the winding being connected to a commutator at which the direct current is collected. The rectifier is preferably rotated by a synchronous motor F. As neither of these devices are specifically novel to the present invention and have been applied to purposes of regulation heretofore it is not necessary to describe them more in detail. It is obvious that the direct current output of the rectifier E will vary proportionally to the fluctuations in the transformers D.

The output of the rectifier E is supplied to the field winding G' of a dynamo G which may be rotated by the synchronous motor F, heretofore referred to. This dynamo acts as an exciter for the field winding c' of the alternating current end of the motor generator, the terminals of said field winding being directly connected to the brushes of the dynamo. Every variation therefore in the main generator current will cause a corresponding variation in the current in the field winding c' and thereby vary the electro-motive force generated by the alternating current end of the motor generator. The current supplied to the field winding c of the direct current end of the motor generator is obtained from the battery B. In the present instance the field winding c is shown in circuit with a portion of said battery. In this same circuit, therefore, the dynamo G is included, its electro-motive force opposing that of the battery. The electro-motive force of the dynamo should be less than that of the portion of the battery employed so that any increase of current on the main generator, producing an increased electro-motive force of the dynamo G, will serve to decrease the current in the field winding c, and, therefore, decrease the electro-motive force generated by the direct current end of the motor generator. A direct current work circuit may be connected to the direct current side of the system if desired.

When the generator A is giving out exactly the current for which the system is adjusted the voltage of dynamo G will be such that the field windings c and c' will receive the proper currents to cause the motor C to float across the line transferring energy in neither direction. Whenever the current in the generator A increases above its desired average the increased voltage of dynamo G will simultaneously cause the electro-motive force generated by armature C to fall and the electro-motive force generated by armature C' to rise, thus causing the battery to drive the direct current end of the motor generator as a motor, and cause the alternating current end of the motor generator to give out energy to the work circuit. When the main generator current falls below the desired average the reverse takes place and energy is transferred from the alternating current side of the system to the battery. The simultaneous regulation of both fields of the motor generator enables a sensitive regulation and simplifies the apparatus required.

It will, of course, be understood that such a system in practice will be provided with various adjusting rheostats and other devices in the various circuits, that additional transformers may be provided in the regulating circuits, and, in general, that various details for the convenient manipulation of the system will be provided in conformity with the usual practice of the art.

Having thus described my invention, what I claim as new and desire to secure by Letters Patent, is:—

1. In an electrical system of distribution, two sources of electric supply, a motor generator connecting the same, and means for oppositely regulating the electro-motive forces generated by the two ends of the motor generator responsively to fluctuations of load of one of said sources.

2. In an electrical system of distribution, two sources of electric supply, a motor generator connecting the same, and means for oppositely regulating the field strengths of the two ends of the motor generator responsively to fluctuations of load of one of said sources.

3. In an electrical system of distribution, a motor generator, means for transferring energy in either direction therethrough, and means for oppositely regulating the electro-motive forces generated by the two ends of the motor generator responsively to the same variations of electric condition of the system.

4. In an electrical system of distribution, a motor generator, means for transferring energy in either direction therethrough, and means for oppositely regulating the field strengths of the two ends of the motor generator responsively to the same variations of electric condition of the system.

5. In an electrical system of distribution, an alternating current generator supply circuit, an alternating current work circuit, a direct current circuit, a motor generator connecting the alternating current and direct current sides of the system, means for supplying electric energy to the direct current end of the motor generator, and means for oppositely regulating the electro-motive forces generated by the two ends of the motor generator responsively to the same variations of alternating current generator load.

6. In an electrical system of distribution, an alternating current generator, an alternating current work circuit, a direct current circuit, a motor generator connecting the alternating current and direct current sides of the system, means for supplying electric energy to the direct current end of the motor generator, and means for oppositely regulating the field strengths of the two ends of the motor responsively to the same variations of alternating current generator load.

7. The combination of an alternating current generator, a storage battery, a motor generator connected at its direct current end to the battery and at its alternating current end to the generator, and means for oppositely varying the field strengths of the two ends of the motor generator responsively to changes in the alternating current side of the system.

8. The combination of an alternating current generator, a storage battery, a motor generator connected at its direct current end to the battery and at its alternating current end to the generator, and means for oppositely varying the electro-motive forces generated by the two ends of the motor generator responsively to changes in the alternating current side of the system.

9. The combination of an alternating current generator, an alternating current work circuit, a storage battery, a motor generator connecting the alternating current side of the system with the battery; and means for oppositely varying the electro-motive forces generated by the two ends of the motor generator responsively to changes of electrical condition of the said generator.

10. The combination of an alternating current generator, an alternating current work circuit, a storage battery, a motor generator connecting the alternating current side of the system with the battery, and means for oppositely varying the field strengths of the two ends of the motor generator responsively to changes of electrical condition of said generator.

11. The combination of an alternating current generator, an alternating current work circuit, a storage battery, a motor generator connecting the alternating current side of the system with the battery, and means for oppositely varying the electro-motive forces generated by the two ends of the motor generator responsively to changes of current strength of said generator.

12. The combination of an alternating current generator, an alternating current work circuit, a storage battery, a motor generator connecting the alternating current side of the system with the battery, a coil in the alternating current generator circuit, and apparatus controlled by said coil and connected and arranged to oppositely regulate the field strengths of the direct current and alternating current ends of the motor generator.

13. The combination of an alternating current generator, a coil in the circuit thereof, an alternating current work circuit and a motor generator both connected to the system beyond said coil, a storage battery connected to the direct current end of the motor generator, and apparatus controlled by said coil and acting oppositely upon the two fields of the motor generator.

14. The combination of an alternating current generator, an alternating current work circuit, a storage battery, a motor generator connecting the alternating current side of the system with the battery, an alternating regulating circuit, a rectifying device supplied thereby, and means for oppositely regulating the fields of the two ends of the motor generator responsively to variations of the output of said rectifying device.

15. The combination of an alternating current generator, an alternating current work circuit, a storage battery, a motor generator connecting the alternating current side of the system with the battery, a series transformer in the alternating current generator circuit and apparatus supplied thereby and acting oppositely upon the two field magnets of said motor generator.

16. The combination of an alternating current generator, an alternating current work circuit, a storage battery, a motor generator connecting the alternating current side of the system with the battery, a series transformer in the alternating current generator circuit, a rectifying device supplied thereby, and means for oppositely regulating the strengths of the two field magnets of the motor generator responsively to variations of output of the rectifying device.

17. The combination of an alternating current generator, an alternating current work circuit, a storage battery, a motor generator connecting the alternating current side of the system with the battery, a series transformer in the alternating current generator circuit, a rectifying device supplied thereby, a dynamo excited from the rectifying device, and connections from said dynamo to the field windings of the motor generator arranged to oppositely affect the two field magnets of the same.

18. The combination of an alternating current generator, an alternating current work circuit, a storage battery, a motor generator connecting the alternating current side of the system with the battery, a series transformer in the alternating current generator circuit, a rectifying device supplied thereby, a dynamo excited from the rectifying device, said dynamo being so connected to the field windings of said motor generator as to act as an exciter for one field magnet thereof and as a counter machine for the other.

19. The combination of an alternating current generator, a motor generator, a direct current circuit connected thereto, and apparatus controlled by variations of electrical condition of the alternating current side of the system and controlling the field strength of the alternating current end of the motor generator.

20. The combination of an alternating current generator, a motor generator, a direct current circuit connected thereto, and apparatus controlled by variations of current strength of the alternating current generator and controlling the field strength of the alternating current end of the motor generator.

21. The combination of an alternating current generator, a motor generator, a direct current circuit connected thereto, and apparatus controlled by variations of current strengths of the alternating current generator and arranged to increase the field strength of the alternating current end of the motor generator as the alternating current generator current increases and vice versa.

22. The combination of an alternating current generator, a motor generator, a direct current circuit connected thereto, a storage battery connected therein, and apparatus controlled by variations of electrical condition of the alternating current side of the system and controlling the field strength of the alternating current end of the motor generator.

23. The combination of an alternating current generator, a motor generator, a direct current circuit connected thereto, a storage battery connected therein, and apparatus controlled by variations of current strength of the alternating current generator and controlling the field strength of the alternating current end of the motor generator.

24. The combination of an alternating current generator, a motor generator, a direct current circuit connected thereto, a storage battery connected therein, and apparatus controlled by variations of current strength of the alternating current generator and arranged to increase the field strength of the alternating current end of the motor generator as the alternating current generator current increases and vice versa.

25. The combination of an alternating current generator, a motor generator, a direct current circuit connected thereto, and apparatus controlled by variations of current strengths of the alternating current generator and arranged to increase the field strength of the alternating current end of the motor generator and decrease the field strength of the direct current end of the motor generator as the alternating current generator current increases and vice versa.

26. The combination of an alternating current generator, a motor generator, a direct current circuit connected thereto, a storage battery connected therein, and apparatus controlled by variations of current strengths of the alternating current generator and arranged to increase the field strength of the alternating current end of the motor generator and decrease the field strength of the direct current end of the motor generator as the alternating current generator current increases and vice versa.

27. An alternating direct current motor generator, a dynamo supplying current for a field winding on one end of the motor generator, and a source of electric supply connected to a field winding on the other end of the motor generator and to said dynamo in series.

28. An alternating direct current motor generator and a dynamo connected and arranged to supply current to a field winding for one end of the motor generator and to oppose the current in a field winding for the other end of the motor generator.

29. An alternating direct current motor generator and a dynamo connected and arranged to supply current to a field winding on the alternating current end of the motor generator and to oppose the current in a field winding on the direct current end of the motor generator.

30. An alternating direct current motor generator, a dynamo supplying current for a field winding on one end of the motor generator, a source of electric supply connected to a field winding on the other end of the motor generator and to said dynamo in series, and a rectifying device supplied from the alternating current circuit and supplying the exciting current for said dynamo.

31. An alternating direct current motor generator, a dynamo connected and arranged to supply current to a field winding for one end of the motor generator and to oppose the current in a field winding for the other end of the motor generator, and a rectifying device supplied from the alternating current circuit and supplying the exciting current for said dynamo.

32. An alternating direct current motor generator, a dynamo connected and arranged to supply current to a field winding on the alternating current end of the motor generator and to oppose the current in a field winding on the direct current end of the motor generator, and a rectifying device supplied from the alternating current circuit and supplying the exciting current for said dynamo.

33. The combination of an alternating current generator, a motor generator, a storage battery connected to the direct current end thereof, a rectifying device supplied from the alternating current circuit, a dynamo excited by said rectifying device, a field winding for the alternating current end of the motor generator supplied by said dynamo, a field winding for the direct current end of the motor generator, and a circuit containing the latter field winding, the dynamo and the battery in series.

34. The combination of an alternating current generator, a motor generator, a storage battery connected to the direct current end thereof, a rectifying device receiving an alternating current variable with that of the alternating current generator, a dynamo excited by said rectifying device, a field winding for the alternating current end of the motor generator supplied by said dynamo, a field winding for the direct current end of the motor generator, and a circuit containing the latter field winding, the dynamo and the battery in series.

In testimony whereof, I have signed my name to this specification, in the presence of two subscribing witnesses.

WALTER E. WINSHIP.

Witnesses:
 EDWIN SEGER,
 ANNA DALY.